United States Patent [19]
Kuroda et al.

[11] Patent Number: 5,527,235
[45] Date of Patent: Jun. 18, 1996

[54] TRANSMISSION-CONTROLLING SYSTEM

[75] Inventors: Kouichi Kuroda, Yokohama; Tomoyoshi Adachi, Machida; Masaya Kato, Yokohama, all of Japan

[73] Assignee: Isuzu Motors Limited, Tokyo, Japan

[21] Appl. No.: 409,600

[22] Filed: Mar. 24, 1995

[30] Foreign Application Priority Data

Apr. 28, 1994 [JP] Japan .................................. 6-114548

[51] Int. Cl.$^6$ ............................................. F16H 59/04
[52] U.S. Cl. ............................................. 477/94
[58] Field of Search .................... 477/92, 94, 96

[56] References Cited

U.S. PATENT DOCUMENTS

| | | | |
|---|---|---|---|
| 4,971,400 | 11/1990 | Jonner | 303/110 |
| 5,109,962 | 5/1992 | Sato | 192/4 A |
| 5,113,718 | 5/1992 | Sato | 180/197 |
| 5,125,490 | 6/1992 | Suzumura et al. | 475/86 |
| 5,262,952 | 11/1993 | Tsuyama et al. | 364/426.03 |

*Primary Examiner*—Dirk Wright
*Attorney, Agent, or Firm*—Spencer & Frank

[57] ABSTRACT

A transmission-controlling system capable of controlling a transmission of a vehicle having both an automatic transmission (AT) and an anti-lock brake system (lBS), without damaging the ABS function is disclosed, in which both a change-speed graph for normal operation and a change-speed graph for acquiring automatic engine brake are incorporated in an AT controller and, when a signal noticing that ABS is in operation is not given from an ABS controller, the AT controller functions to shift gear speed according to the change-speed graph for aquiring automatic engine brake to thereby attain automatic engine brake and, when the signal noticing that ABS is out of operation, the AT controller functions to shift gear speed according to the change-speed graph for normal operation. In the latter case, the automatic engine brake is not acquired, and hence the ABS function is not possibly damaged, and the vehicle does not receive a severe shock.

1 Claim, 3 Drawing Sheets

(Change-speed graph for normal operation)

(Change-speed graph for acquiring automatic engine brake)

TRANSMISSION-CONTROLLING SYSTEM

DESCRIPTION

BACKGROUND OF THE INVENTION

This invention relates to a transmission-controlling system of a vehicle having both an automatic transmission (hereinafter abbreviated as "AT") and an anti-lock brake system (hereinafter abbreviated as "ABS").

In AT vehicles, divergence of a throttle valve of an engine and vehicle speed are detected, a proper speed gear is determined by using both data signals with reference to a predetermined change-speed graph, and the transmission is controlled to shift to the determined speed gear.

FIG. 2 shows an example of a change-speed graph for normal operation, in which vehicle speed is plotted as abscissa and divergence of throttle valve as ordinate. Solid line I shows a 3→4 shift-up curve (a curve showing the time of shifting up the gear from 3rd speed gear to 4th speed gear). When a vehicle driven with a 3rd speed gear acquires an increased vehicle speed in a manner of crossing the shift-up curve I as shown by the arrow A in FIG. 2, the transmission is controlled to select the 4th speed gear.

Dotted line II shows a 4→3 shift-down curve (a curve showing the time of shifting down the gear from 4th speed gear to 3rd speed gear). When a vehicle driven with a 4th speed gear acquires a decreased vehicle speed in a manner of crossing the shift-down curve II as shown by the arrow B in FIG. 2, the transmission is controlled to select the 3rd speed gear.

Although FIG. 2 shows only two curves relating to 3rd and 4th speeds, there exist curves relating to 1st speed, 2nd speed, etc.

On the other hand, AT vehicles for business use suffer more abrasion of a brake lining than AT passenger vehicles because they are driven in a heavily loaded state with putting on brake many times. Therefore, in order to reduce the abrasion, a so-called "automatic engine brake control" has been considered which functions to automatically acquire engine brake when application of brake is necessary. To be specific, the automatic engine brake control is to control so that, when a throttle valve position of a vehicle driven with a 4th speed gear at a speed within a predetermined range is restored to the idle position, the speed gear is automatically shifted down to the 3rd speed gear.

FIG. 3 shows an example of a change-speed graph for acquiring automatic engine brake. Symbols used in FIG. 3 correspond to those used in FIG. 2. As can be immediately seen by comparing with FIG. 2, both solid line I and dotted line II in FIG. 3 make a turn to the right at a certain small throttle valve divergence in a direction in which vehicle speed increases and, after advancing a certain distance in a direction almost parallel to the abscissa, they again make a turn in a downward direction almost parallel to the ordinate. Change-speed graphs of such patterns can attain the automatic engine brake control.

For example, when a throttle valve of a vehicle driven at a speed within the range of the change-speed curve II being almost parallel to the abscissa is restored to the idle position (at which the divergence of the throttle valve is zero on the ordinate), the throttle valve divergence crosses the change-speed curve II from above (4th speed side) to below (3rd speed side) as shown by the arrow C, thus the transmission being controlled to shift down to the 3rd speed gear to acquire engine brake. In the normal operation shown by FIG. 2, the divergence change as shown by the arrow C would not cross the change-speed curve II, and hence no shifting down to the 3rd speed gear takes place. Accordingly, a required brake must be obtained by pedaling a foot brake, leading to a rapid abrasion of a brake lining.

On the other hand, there is known ABS as a system for not causing slip of wheels upon putting on brake. This is a system which detects the rotating speed of wheels and, when wheels are nearly locked, automatically reduces the braking power to thereby prevent wheels from being locked. This ABS is also often loaded on AT vehicles.

In the conventional transmission-controlling system for acquiring automatic engine brake, this system functions independently from ABS. Therefore, there have been a problem that ABS function might be damaged and a problem that a serious shock is produced upon shifting gear.

When a driver removes his foot from the accelerator pedal during driving a vehicle at a 4th speed, the throttle valve is restored to the idle position, and the transmission-controlling system for acquiring engine brake functions to shift down the gear to a 3rd speed gear. Thus, each wheel receives a braking power due to engine brake. However, if this happens during the period wherein ABS is in operation (to reduce the braking power on each wheel), ABS function might be damaged.

In addition, when automatic engine brake is acquired to shift down the gear to the 3rd speed gear upon ABS being in operation, a serious shock is produced upon shifting of gear if the rotation number on the engine side is greatly different from that on the transmission side. If rotating wheels are in contact with a split-surfaced road (for example, a road separated into a frozen surface-having portion and a non-frozen surface-having portion), vehicle stability in the running direction is damaged by the shock to possibly cause a traffic accident.

The subject of this invention is to solve the above-described problems.

SUMMARY OF THE INVENTION

The above-described subject is solved by a transmission-controlling system having a sensor for detecting divergence of a throttle valve, a sensor for detecting vehicle speed, a hydraulic mechanism for shifting gear, and an AT controller which has change-speed graphs for determining a proper gear based on the detected divergence of a throttle valve and the vehicle speed and controls the hydraulic mechanism to shift gear, in which the AT controller has both a change-speed graph for normal operation and a change-speed graph for acquiring automatic engine brake and is constituted to receive a signal whether an anti-lock brake system is in operation or not and, when a signal noticing that ABS is in operation is given to the AT controller, it selects the change-speed graph for normal operation to control the transmission and, when such signal is not given, it selects the change-speed graph for acquiring engine brake to control the transmission.

Since the AT controller controls gear shifting according to the change-speed graph for acquiring automatic engine brake during the period in which ABS does not function, the automatic engine brake control is conducted if the accelerator pedal is eased up to restore the throttle valve to the idle position. However, upon receiving a signal noticing that ABS is in operation, the AT controller now controls gear shifting according to the change-speed graph for normal operation, the automatic engine brake control is not conducted. Thus, there is no possibility of ABS function being damaged and no possibility of a serious shock being given to the vehicle.

DETAILED DESCRIPTION OF THE PREFERRED EMBODIMENT OF THE INVENTION

Figure 1:
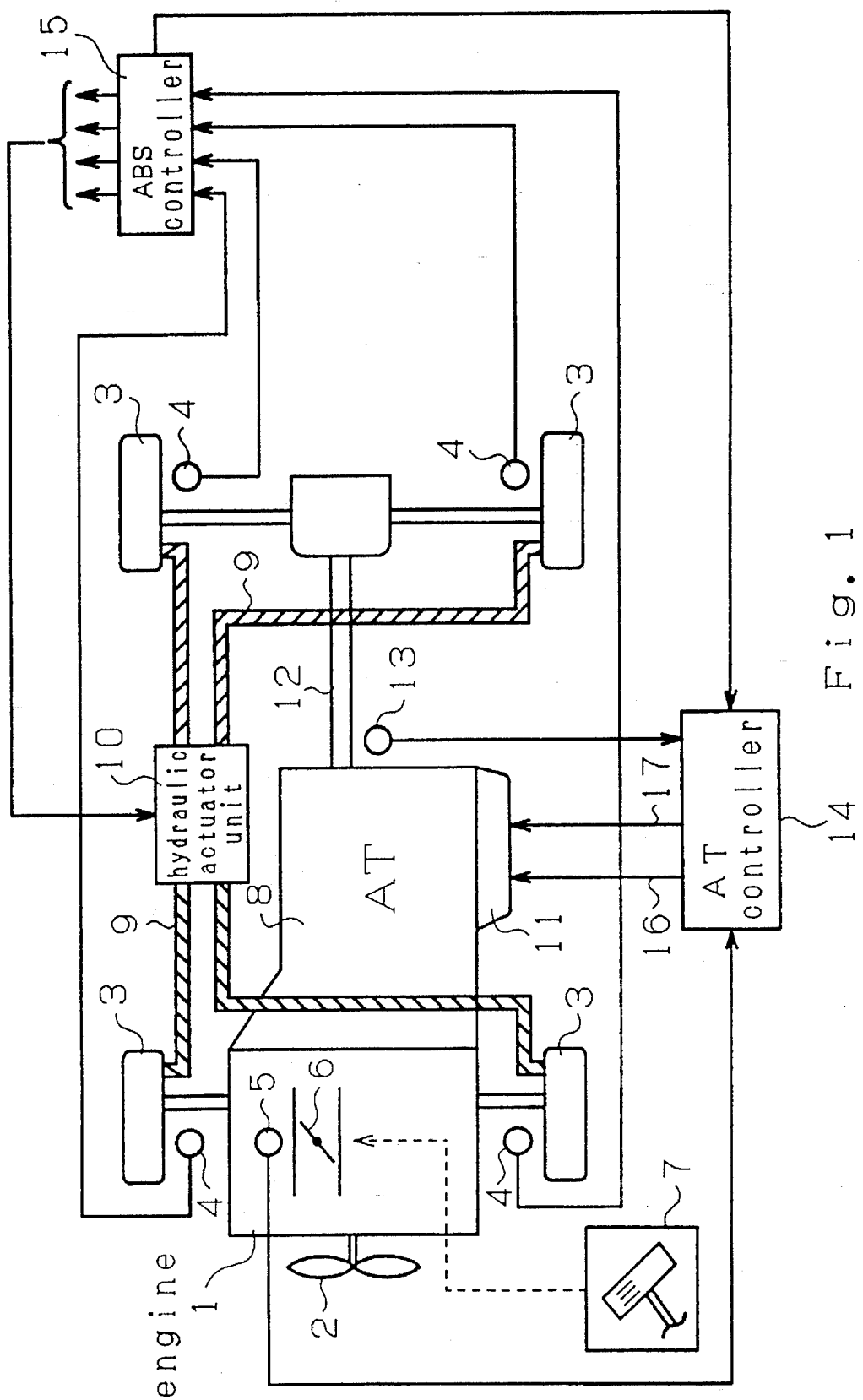
FIG. 1 is a drawing showing a transmission-controlling system of the present invention.

An embodiment of the present invention is now described in detail by reference to the drawings. In FIG. 1, numeral 1 designates an engine, 2 a fan, 3 a wheel, 4 a wheel speed sensor, 5 a sensor for detecting divergence of throttle valve, 6 a throttle valve, 7 an accelerator pedal, 8 AT (an automatic transmission), 9 a hydraulic pipe for braking, 10 a hydraulic actuator unit, 11 a hydraulic mechanism for gear shifting, 12 a propeller shaft, 13 a vehicle speed sensor, 14 an AT controller, 15 an ABS controller, 16 a first-shift solenoid actuating signal, and 17 a second-shift solenoid actuating signal.

The AT controller 14 automatically controls gear shifting in AT 8 according to a predetermined change-speed graph. The ABS controller 15 controls braking power so that each wheel will not be locked to cause slipping. Divergence of the throttle valve 6 can be changed by changing the degree of treadling the accelerator pedal 7. The sensor 5 for detecting divergence of throttle valve detects divergence of the throttle valve.

The hydraulic mechanism 11 for gear shifting is attached to the AT 8, and functions to properly actuate two gear-shifting solenoids (not shown) for shifting gears to desired positions. The hydraulic actuator unit 10 gives a hydraulic pressure to each wheel via the hydraulic pipe 9 for braking, thus adjusting braking power. The wheel speed sensor 4 applied to each wheel 3 detects rotation speed of each wheel.

A signal from the wheel speed sensor 4 is given to the ABS controller 15. Upon receiving the signal, the ABS controller 15 gives a controlling signal to the hydraulic actuator unit 10 to adjust braking power so that each wheel 3 will not be locked.

Figure 2:
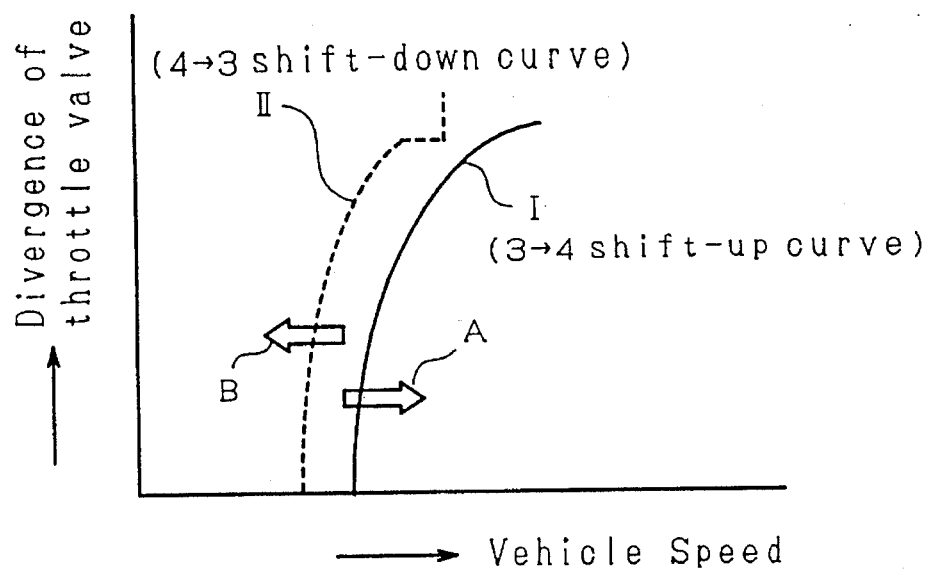
FIG. 2 is a change-speed graph for normal operation.
Figure 3:
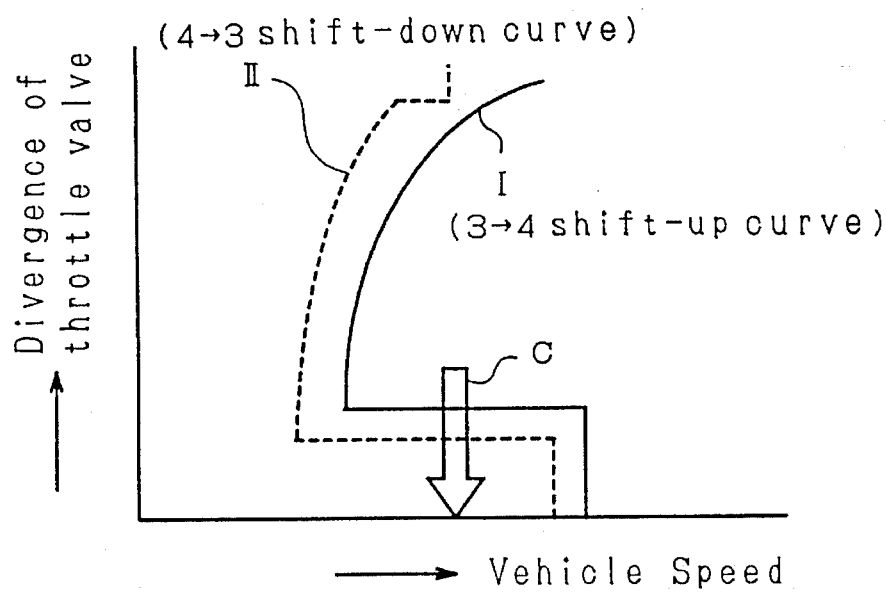
FIG. 3 is a change-speed graph for acquiring automatic engine brake.

The AT controller 14 has both a normal change-speed graph (see FIG. 2) and a change-speed graph for acquiring automatic engine brake (see FIG. 3) as base change-speed graphs for controlling transmission. It decides a proper speed gear based on vehicle speed detected by the vehicle speed sensor 13 and divergence of throttle valve detected by the sensor 5 for detecting divergence of throttle valve by referring to the two graphs, and gives a first-shift solenoid actuating signal 16 and a second-shift solenoid actuating signal 17 to the hydraulic mechanism 11 for gear shifting.

The ABS controller 15 is constituted so that a signal noticing whether ABS control is conducted or not (hereinafter referred to as "ABS operation signal") is transferred from the ABS controller 15 to the AT controller 14. In FIG. 1, an arrow from ABS controller 15 to AT controller 14 shows the route for transferring the ABS operation signal, a feature of the present invention is that, when a signal noticing that ABS is in operation is given, a change-speed graph for normal operation is selected and, when no such signal is given, a change-speed graph for acquiring automatic engine brake is selected.

a more detailed description is given below.

Figure 4:
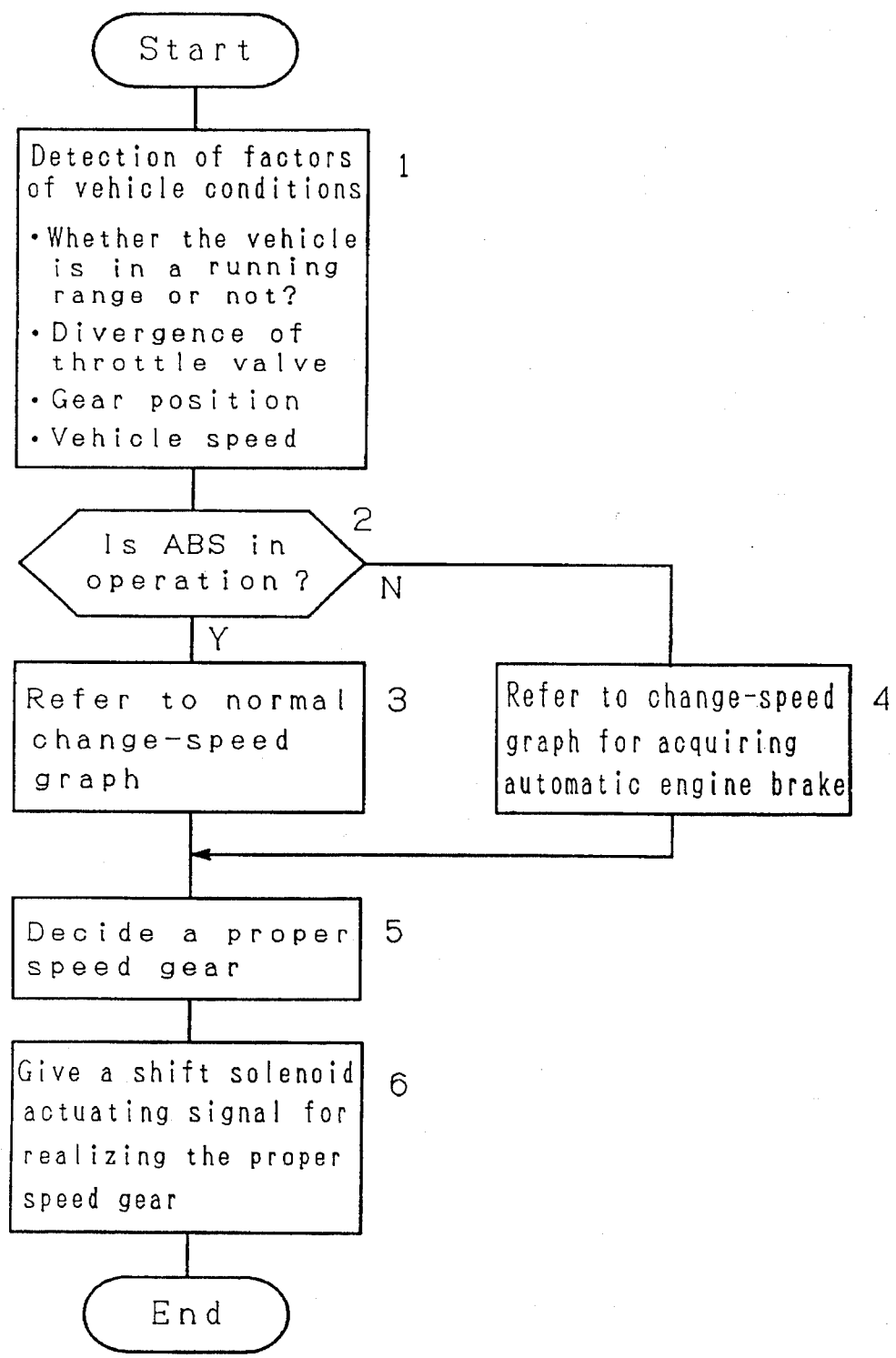
FIG. 4 is a flow chart illustrating how to control the transmission according to the present invention.

FIG. 4 is a flow chart illustrating how the transmission is controlled in the present invention.

Step 1—Detections of factors on conditions of vehicles necessary for controlling the transmission. For example, it is detected whether the vehicle is in a running range. Similarly, gear position, vehicle speed, etc. are detected. The running range and gear position can be detected by means of a gear position sensor provided within AT 8.

Step 2—Before initiation of the transmission control, it is detected whether ABS controller 15 is in operation or not. This detection is conducted by checking whether the ABS operation signal from ABS controller 15 indicates the value which notices that ABS is in operation or not.

Step 3—If ABS is in operation, the automatic engine brake control is not conducted. Otherwise, there arises the problem of ABS function being damaged or the like as has been described hereinbefore. Therefore, a change-speed graph for normal operation is selected in this case.

Step 4—If ABS is not in operation, it is better to conduct automatic engine brake control from the standpoint of reducing abrasion of a brake lining. Hence, a change-speed graph for acquiring automatic engine brake is selected.

Step 5—The detected vehicle speed and the detected divergence of throttle valve are applied to the selected change-speed graph to determine a desired speed gear.

Step 6—AT controller 14 gives a first-shift solenoid actuating signal 16 and a second-shift solenoid actuating signal 17 to hydraulic mechanism 11 for gear shifting so as to select the determined gear. The determined gear is thus shifted to a proper position by combination of on and off of the first and the second shift solenoid.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all the changes which come within the meaning and range of equivalency of the claim are therefore intended to be embraced therein.

What is claimed is:

1. A transmission-controlling system having a sensor for detecting divergence of a throttle valve, a sensor for detecting vehicle speed, a hydraulic mechanism for shifting gear, and an AT controller which has change-speed graphs for determining a proper gear based on the detected divergence of a throttle valve and the vehicle speed and controls the hydraulic mechanism to shift gear, in which the AT controller has both a change-speed graph for normal operation and a change-speed graph for acquiring automatic engine brake and is constituted to receive a signal whether an anti-lock brake system is in operation or not and, when a signal noticing that ABS is in operation is given to the AT controller, it selects the change-speed graph for normal operation to control the transmission and, when such signal is not given, it selects the change-speed graph for acquiring engine brake to control the transmission.

* * * * *